(12) United States Patent
Subbloie et al.

(10) Patent No.: US 7,065,496 B2
(45) Date of Patent: Jun. 20, 2006

(54) SYSTEM FOR MANAGING EQUIPMENT, SERVICES AND SERVICE PROVIDER AGREEMENTS

(75) Inventors: Al Subbloie, Woodbridge, CT (US); Charles Gamble, Woodbridge, CT (US); Paul Schmidt, Rocky Hill, CT (US)

(73) Assignee: Tangoe, Inc., New Haven, CT (US)

( * ) Notice: Subject to any disclaimer, the term of this patent is extended or adjusted under 35 U.S.C. 154(b) by 0 days.

(21) Appl. No.: 10/365,006

(22) Filed: Feb. 12, 2003

(65) Prior Publication Data

US 2003/0154123 A1    Aug. 14, 2003

Related U.S. Application Data

(60) Provisional application No. 60/356,925, filed on Feb. 13, 2002.

(51) Int. Cl.
*G06F 17/60* (2006.01)

(52) U.S. Cl. ............................................. 705/11; 705/1
(58) Field of Classification Search .................... 705/7, 705/11, 1
See application file for complete search history.

(56) References Cited

U.S. PATENT DOCUMENTS

| 5,864,483 | A | * | 1/1999 | Brichta | 700/109 |
| 5,905,715 | A | * | 5/1999 | Azarmi et al. | 370/244 |
| 6,144,943 | A | * | 11/2000 | Minder | 705/11 |
| 6,343,290 | B1 | * | 1/2002 | Cossins et al. | 707/10 |
| 6,629,008 | B1 | * | 9/2003 | Shiiba et al. | 700/100 |
| 2002/0099578 | A1 | * | 7/2002 | Eicher et al. | 705/7 |
| 2002/0099579 | A1 | * | 7/2002 | Stowell et al. | 705/7 |

FOREIGN PATENT DOCUMENTS

WO    WO 9925085 A1    *    5/1999

OTHER PUBLICATIONS

Nathan "Managing Service Level Agreements" 1999; Int. Network Mgmt. 9, 155-166.*
Dialog "Inverse announces IP service level management strategy & prods for ISPs and enterprises"; Feb. 1999; M2 Presswire; Dialog 20, Accession No. 04467781/7.*
BMC Software "BMC Software Strengthens Focus on Service Level Management with PATROL for SLM"; Nov. 2000; BMC Software in The News.*

* cited by examiner

*Primary Examiner*—Romain Jeanty
(74) *Attorney, Agent, or Firm*—St. Onge Steward Johnson & Reens LLC

(57) ABSTRACT

A system for managing service provider agreements, the system comprising a server, an agreements database accessible by the server, the agreements database having stored thereon contracted performance data indicative of minimum service performance required by at least one service provider agreement, a user preferences database accessible by the server, the preferences database having stored thereon user preference data indicative of a user specified maximum allowable deviance from the minimum service performance, a performance measurement module in communication with the server; the performance measurement module gathering actual performance data indicative of actual service performance and a variance calculator in communication with the server, the variance calculator determining agreement conformity status by determining whether the actual system performance indicated by the actual service performance data corresponds with the minimum service performance indicated by the contracted performance data within the maximum allowable deviance indicated by the user preference data.

14 Claims, 5 Drawing Sheets

SYSTEM FOR MANAGING EQUIPMENT, SERVICES AND SERVICE PROVIDER AGREEMENTS

This application claims the benefit of Provisional Application No. 60/356,925, filed Feb. 13, 2002.

FIELD OF THE INVENTION

A process that calculates the variance between actual and targeted service provider performance and more particularly, a process that calculates the variance between actual and targeted telecommunication performance metrics across multiple categories allowing the user to define variance tolerances and dictate appropriate responses including closed loop tracking resolution.

BACKGROUND OF THE INVENTION

In the past, it has been difficult for businesses to track the delivery and performance of service provider services, e.g. telecommunications, on an ongoing basis. The four key difficulties in tracking the variance between targeted and actual service provider performance metrics are that (i) identifying appropriate targets has been difficult, (ii) measuring actual performance on a regular basis has been time consuming if not impossible, (iii) comparing the actual performance with targeted performance has been prohibitively time consuming and, (iv) taking the proper action once acceptable variances have been exceeded has been difficult and costly.

In most cases a business would need to rely on the service provider vendor to police itself and inform the business if the service provider's service being provided had fallen below promised levels of service or if rates had fallen below the company's existing rates or if bills were inaccurate and so on. In some limited cases, bill auditing, for example, the business could hire an outside, independent firm to determine the variance between actual and targeted services. The process these third-party firms would use would be manual and limited in scope. This lack of an objective, comprehensive monitoring system has resulted in higher rates and lower levels of service delivery and/or performance than the user expected.

Historically, users have filed service provider contracts and service level agreements away after execution. These agreements have been difficult to refer to during their term to ensure compliance. Also, further compounding the difficulty, is that separate groups within an organization typically handle service procurement, contract management and accounts payable. While these three disciplines all need to be involved to manage properly a company's service provider expenditures, it is not atypical that the three groups have limited or no communication during the service provider contract term.

This invention is comprehensive in that it measures the variance across multiple categories such as rates, billing, service levels, contracts, utilization and design. Also, this invention covers all major types of service provider services including voice and data, Internet, wireline, wireless based services and service provider agreements such as application, storage, management, Internet, online, telecommunications, peering, collocation, T-carrier, E-carrier, and DSO multiples, fractional T-1, fractional T-3, information, outsourcing, hosting, financial, service level, data, voice, utilities, gas, water, sewer and combinations of these.

SUMMARY OF THE INVENTION

Accordingly, it is an object of the present invention is to provide users with better control over the costs and service levels they receive from their service provider vendors and more particularly to telecommunication vendors. As voice and data services become increasingly important to the business user, the ability to measure actual telecommunication performance against targeted performance and to initiate resolution processes becomes imperative.

Another object of the invention is to provide the user with an easy method to track actual service provider agreement performance across multiple categories against targeted performance goals that can be customized by the user. Furthermore, the invention allows the user to define variance thresholds and dictate courses of action once those thresholds have been exceeded.

A further object of the invention is to provide an easily accessible storage depository, such as a database, to maintain performance targets. In the past, these performance targets have resided in paper contracts provided by the carrier and that are often difficult to decipher on an ongoing basis or the performance targets have resided in the minds of specially-trained personnel who may not be accessible on a regular basis to ensure that performance targets are articulated.

Still yet another object of the invention is to provide automated access to actual service provider agreement performance. In the past, this data was provided largely by the service provider agreement vendor in a format that was difficult to compare to targeted performance or by third parties in a format that does not lend itself to an easy comparison to targeted objectives. By identifying the key components of service provider agreement performance and regularly recording them in an easily accessible format, e.g. electronic, the invention allows for easy reconciliation between targets and actual performance.

And still yet another object of the invention provides the user the ability to define variance thresholds between targeted and actual service provider agreement performance. Because variance thresholds are a function of the unique properties of the business, it is important that each business be given the flexibility to establish its own variance tolerance. In the past, variance thresholds have not been clearly defined by the users' service provider agreement and often thresholds would be exceeded without appropriate actions being taken.

Another object of the invention provides the user with the ability to customize courses of action once the variance threshold has been exceeded. The course of action may include notification to a distribution list of contacts inside and outside the user organization. Additionally, the user may define a closed-loop resolution process that includes soliciting and tracking a credit from the service provider agreement vendor. In the past, service provider agreement users would not seek credits from their service provider agreement vendors because either they were not aware of credits due or because they determined that the potential credit did not justify the work involved in securing the credit.

And still yet another object of the invention provides that the user will no longer have to depend on the service provider agreement vendor to self-report on their own performance levels and also that the tests can be run automatically and regularly with minimal effort on the part of the user.

A further object of the invention is to allow the user to define the appropriate response to a variance occurrence, the user can readily communicate internally and externally and more quickly and cost-effectively react to both credit and performance issues. In addition to improved quality of service provider agreement services, the user can anticipate reduced costs and increased service levels.

These and other objects of the present invention are achieved by provision of a system for managing service provider agreements, the system comprising a server, an agreements database accessible by the server, the agreements database having stored thereon contracted performance data indicative of minimum service performance required by at least one service provider agreement, a user preferences database accessible by the server, the preferences database having stored thereon user preference data indicative of a user specified maximum allowable deviance from the minimum service performance, a performance measurement module in communication with the server; the performance measurement module gathering actual performance data indicative of actual service performance and a variance calculator in communication with the server, the variance calculator determining agreement conformity status by determining whether the actual system performance indicated by the actual service performance data corresponds with the minimum service performance indicated by the contracted performance data within the maximum allowable deviance indicated by the user preference data.

The present invention can provide at least one threshold set in the user preferences database and a notification module to notify a recipient that the manipulated preferences and performance data has exceeded a threshold. The system can also comprise a network connection in communication with the server, a host interface coupled to the network connection, the host interface used for hosting the system and a user interface in communication with the network connection, the user interface used for updating user preferences database and thresholds.

Preferably, the system includes a scheduling module coupled to the server, the scheduling module used to define chronological timing of the variance calculator's determination of agreement conformity status. The system can work on various service provider agreements such as application, storage, management, internet, online, telecommunications, peering, collocation, T-carrier, E-carrier, and DSO multiples, fractional T-1, fractional T-3, information, outsourcing, hosting, financial, service level, data, voice and combinations of these.

The present invention also includes a method of managing service provider agreements by storing at least one user profile containing user thresholds and preferences data, retrieving periodically to a variance module the user preferences and thresholds as well as real-time operations data and comparing the preferences, thresholds and operations data to reveal conformity status of the service provider agreement and to see if a threshold has been exceeded. The method can further comprise the steps of notifying at least one recipient if a threshold has been exceeded, soliciting a credit from a service provider for exceeding the threshold, tracking a credit provided by a service provider for exceeding a threshold, tracing the exceeded threshold until resolution, procuring alternative equipment if the manipulated preferences and operations data points to this conclusion and procuring alternative services if the manipulated preferences and operations data points to this conclusion.

Preferably, the system includes a system for facilitating the procurement of networked services, the system comprising a server, a user preferences database accessible by the server, the user preferences database having stored thereon user need data indicative of a user's requirements for networked services, a service provider database accessible by the server, the service provider database having stored thereon available services data indicative of services offered by a plurality of network service providers, a provider module in communication with the server, the provider module updating in real-time the available services data and a variance module in communication with the server, the variance module determining procurement prospects by determining which of the services offered by the plurality of networked service providers indicated in the available services data satisfies the user's requirements for networked services indicated in the user need data.

The system can further comprise a network connection in communication with the server, a host interface coupled to the network connection, the host interface used for hosting the system, a user interface in communication with the network connection, the user interface used for updating user preferences database, at least one threshold set in the user preferences database, and a notification module to notify a recipient that the determined agreement conformity status has exceeded a threshold and a network connection in communication with the server, a host interface coupled to the network connection, the host interface used for hosting the system and a user interface in communication with the network connection, the user interface used for updating user preferences database and thresholds.

Also, the system can further comprise a scheduling module coupled to the server, the scheduling module used to define chronological timing of the variance calculator's determination of agreement conformity status. The system can operate on networked services that comprises a type selected from the group consisting of application, storage, management, internet, online, telecommunications, peering, collocation, fractional T-1, fractional T-3, information, outsourcing, hosting, financial, service level, data, voice and combinations of these.

The present invention also includes a method of pricing networked services, the method comprising storing at least one user profile containing user thresholds and preferences data, retrieving periodically to a variance module the user preferences and thresholds as well as real-time provider data, manipulating the preferences and provider data to see if a threshold has been exceeded and to reveal procurement prospects, and generating a procurement analysis based on the user preferences data and provider data. The method can further comprise the steps of notifying at least one recipient if a procurement prospect has been located, and notifying at least one recipient if a threshold has been exceeded.

Preferably, the system includes a system for managing service provider agreements and networked services procurement, the system comprising a server, an agreements database accessible by the server, the agreements database having stored thereon contracted performance data indicative of minimum service performance required by at least one service provider agreement, a user preferences database accessible by the server, the preferences database having stored thereon user preference data indicative of a user specified maximum allowable deviance from the minimum service performance and user need data indicative of a user's requirements for networked services, a performance measurement module in communication with the server; the performance measurement module gathering actual performance data indicative of actual service performance, a service provider database accessible by the server; the service provider database having stored thereon available services data indicative of services offered by a plurality of network service providers, a provider module in communication with the server, the provider module updating in real-time the available services data and a variance calculator in communication with the server, the variance calculator determining agreement conformity status by determining whether the actual system performance indicated by the actual service performance data corresponds with the minimum service performance indicated by the contracted performance data within the maximum allowable deviance indicated by the user preference data and the variance module determining procurement prospects by determining which of the services offered by the plurality of networked service providers indicated in the available services data satisfies the user's requirements for networked services indicated in the user need data.

The invention and its particular features and advantages will become more apparent from the following detailed description considered with reference to the accompanying drawings.

DETAILED DESCRIPTION OF THE DRAWINGS

Figure 1:
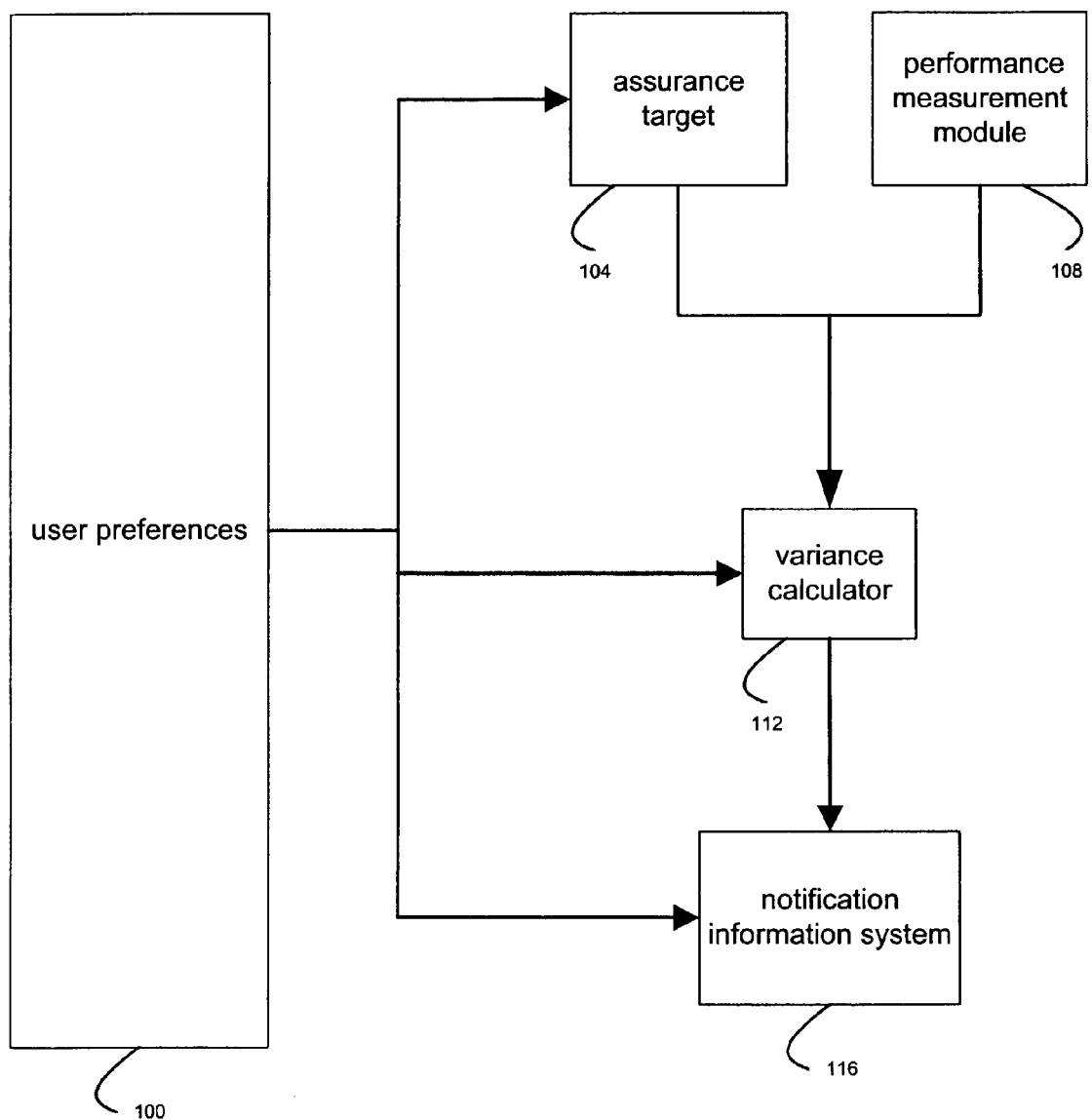
FIG. 1 is a flow chart of an embodiment of the invention.

An embodiment of the invention provides a process, preferably electronic, that allows the user to select parameters along which the variance between actual and targeted performance metrics across multiple categories is calculated for a service provider agreement, e.g. application, storage, management, internet, online, telecommunications, peering, collocation, fractional T-1, fractional T-3, information, outsourcing, hosting, financial, service level, data, voice, combinations of these and the like. If the variance between actual and targeted performance exceeds a user-defined threshold, the user can define specific courses of actions with optional intelligent advice available from the system. Possible courses of action include closed loop tracking resolution until the variance is corrected.

There are numerous categories in which the invention is used. The system will be applied to the various categories such as market rates, contract constructs, service level agreement constructs, network design optimization, utilization and the like. To understand the invention, a brief description of each category will be helpful.

Market rates are optimal rates available in the market for service provider services and products. Historically, rates for service provider services, even from the same vendor, have varied greatly. Market rates are defined as those rates available in the marketplace that an intelligent buyer, with some level of research and negotiating, could secure.

Contract constructs are defined as obligations by either party, the seller or the buyer, that are documented in the service provider's contract used when procuring the service or product. Negotiated rates are an obvious example of a contract construct as are discounts, credits and addendums. The minimum annual commitment is another major contract construct. Other examples include a clause that allows the buyer to renegotiate if market rates fall a pre-defined percentage or a clause that lowers the annual commitment if the buyer's business goes through a down-turn that would impact the buyer's ability to meet the originally committed annual spend.

Service level agreement constructs are similar to contract constructs except that they typically appear in a service level agreement and have to do with the service provider vendor's obligations to deliver a certain level of service including such items as percentage of downtime, mean time to repair and other related performance metrics. The service level agreement also often includes definitions of credits that the service provider vendor must issue if the vendor fails to meet its obligations as well as other recourse alternatives for the user.

Network design optimization means changing a network so that a user can better accomplish his or her same business goal with different services, products or designs. There are, for example, many different ways for a business to set-up a data network. Network design optimization involves looking at the various options and making the optimal selection based on level of service and/or price. The right choice does vary from company to company as some companies will place a premium on service and others will place a premium on price, or some combination thereof.

Utilization involves analyzing one's network to determine whether it's adequately utilized. More often than not, an enterprise's network is either over-utilized or under-utilized. Under-utilization means that a user is paying for more bandwidth than is needed; over-utilization means that network performance could suffer and that mission-critical data could be lost.

In order to illustrate the functionality of the invention in a clear and understandable manner, the representative example of telecommunication service agreements will be used to explain the general nature of how various service provider agreements interact with the invention. For example, the invention includes features and functionality focused on capturing, validating, organizing and monitoring all components of complete telecommunication agreements (i.e. service provider contacts and service level agreements). The data elements, nomenclature and flow are specific to the telecommunications industry and the agreements between enterprises and their communications service providers.

However, even though the data elements and nomenclature for the telecommunications example maybe be different than other service provider agreements, the same inventive concepts can be applied using alternative service provider agreement specific data elements and nomenclature. Examples of included generalized features for different types of service provider agreements are:

All pertinent dates, contacts, companies

All business and legal terms by type of contract (voice, data, wireless and the like)

All negotiated product rates (including tariff, gross, discount percentage, net) for each specific product in the normalized structure outlined above.

All spend commitments (product and schedule specific)

All discounts (flat, percentage, product based, scheduled, qualified, compound discounts, geographic discounts and the like.)

All credits (flat, percentage, one time, recurring, scheduled, qualified, compound discounts, geographic discounts and the like.)

All addendums

All contracted performance criteria and non-compliance remedies

The invention provides query and search mechanisms to quickly locate a specific agreement within the system. Entry of agreement constructs is facilitated by:

Standard base contracts provided to minimize data entry

Prompts for common, repeated information across agreements

Common format for all service provider agreements, e.g. telecommunications agreements, applications service provider agreements and the like Validation of all entered information User interface focused toward the type of service agreement applicable, e.g. telecommunications service agreement, applications service provider agreements and the like Even within the aforementioned criteria, there is a need to standardize or normalize terminology and form within a particular type of service agreement. Consequently, the invention utilizes a normalization scheme to facilitate comparisons between different vendors and/or providers.

For example, using the invention's normalized telecommunications product structure allows for cross carrier comparison and aggregation of usage, performance and spend activity. This normalized product structure (NPS) creates a common data schema to support all telecommunications voice and data service provider products. NPS removes service provider specific nomenclature and proprietary, cryptic product coding. This structure supports information capture, analysis, comparison, testing and reporting across telecommunication service providers. Specific, common values are defined for each level in the hierarchy below:

Product Family
Product Category
Product Type
Product Service
Geography

Applying the foregoing to the particular telecommunications example of voice-intrastate-outbound-switched-Delaware. All activity feeds (Actual Performance Measurements) are converted and mapped to this structure. Examples of these manual and electronic feeds are:

Service provider billing

PBX call accounting system feed

Network monitoring/traffic system feed

Figure 2:
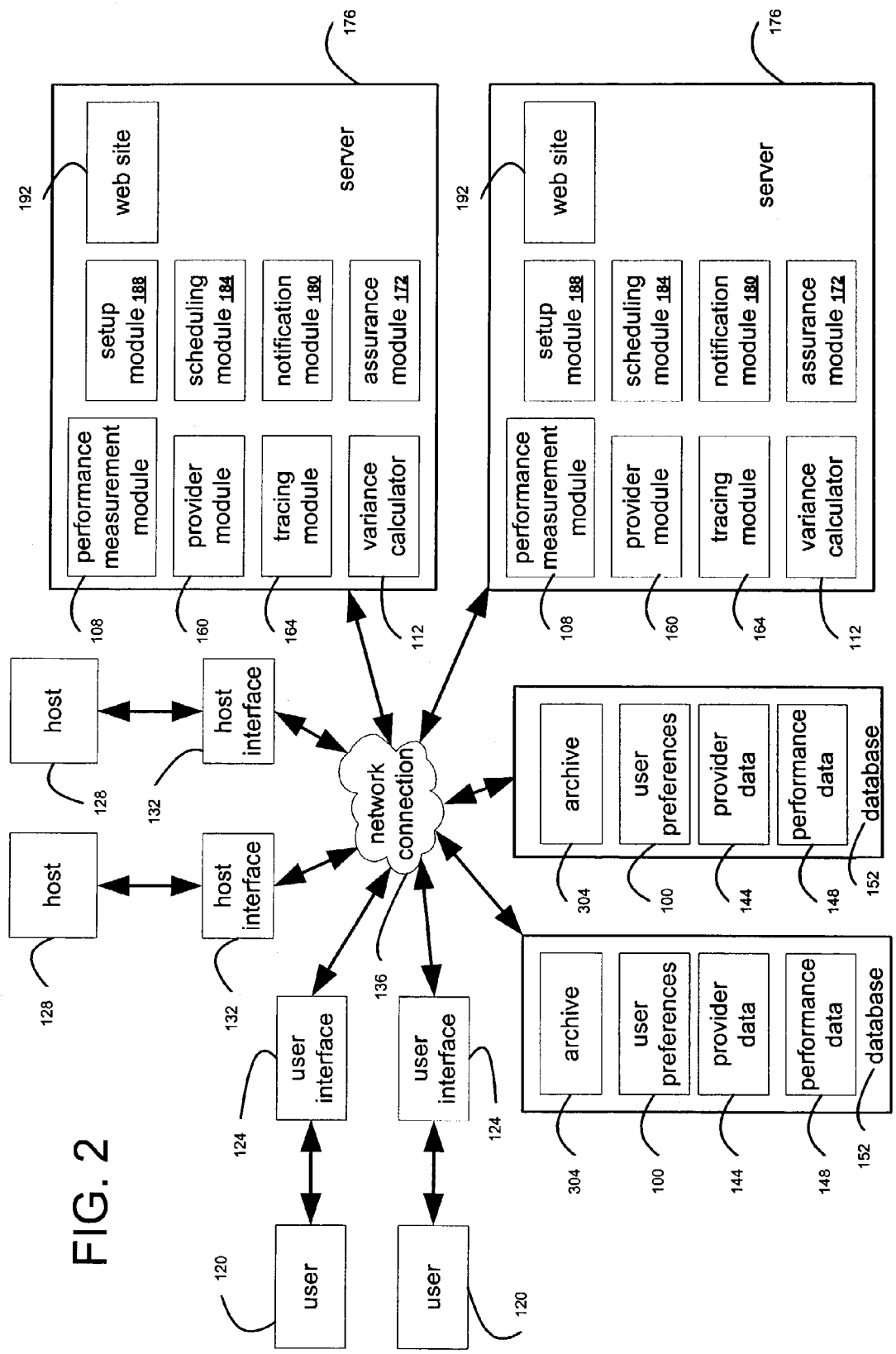
FIG. 2 is a block diagram of an embodiment of the invention represented in FIG. 1.

With this brief overview of the categories, we will now provide a detailed description with examples of each component as outlined in FIG. 1 and referencing FIG. 2.

All provider product data assurance target 104 is captured within this structure within the user preferences 100. This allows variance calculator 112 to utilize common, user configurable, business rule tests across any carrier to identify variances in many categories. The system also provides for automatic creation of new service provider products that are not recognized upon automatic data feed entry.

In one embodiment, there is a user set-up system in which user 120 interacts with the system through user interface 124 that is coupled to network connection 136 to select user preferences 100. Network connection 136 can be any readily available connection such as hardwired, e.g. coaxial cable, optical cable, twisted wire pair or the like, and/or wireless, e.g. infrared, radio frequency, high frequency or the like. Network connection 136 connects the sever 176 with database 152 as well as the optional host interface 132.

Host interface 132 is optional because the invention can be setup in a number of configurations such as strictly client side or thin client or any combination in-between depending on the demands and resources of user 120. A hosted system will generally be run by host 128 communicating through host interface 132 that is coupled to website 192 that is in communication with server 176.

In another embodiment, there are five key components to the invention as represented in FIG. 1. In user preferences 100, user 120 selects a contract ID associated with a telecommunication contract, then selects a category and appropriate sub-categories. Within a category or sub-category, user 120 identifies a target assurance inventory hereinafter called an assurance target 104. The invention provides many customer/user configurable assurance target 104 tests across multiple categories. These tests are specifically focused on the performance of telecommunications services in the following categories:

Contract—terms, commitments, addendums, expiration dates, or the like

Billing—rates, discounts, usage, credits, rounding, call increment, recurring and non-recurring charges, billing intervals, or the like Market Rates—industry pricing versus contracted rates Service Level Agreement—verifying performance criteria Inventory—verification of inventory existence, valid billing dates, features, products, or the like Configuration—potential alternative solutions to current service configuration or the like Utilization—under/over utilization tests for all installed inventory items or the like Usage Correlation—cross matching usage against multiple activity feeds (carrier billing to PBX call accounting) or the like Business Usage—configurable variance tests based on customer provided business data (i.e. telecom budgets by period) or the like Each test is focused on a specific performance measurement. Each test can be easily configured by the user in the following ways:

Frequency of scheduled execution of the test

Event to trigger the execution of the test

Acceptable thresholds of variance (both high and low, positive and negative)

Specific performance parameter variables

All or specific Target Inventory to test

All or specific service provider (i.e. AT&T) to test

What the alert or notification of a variance contains

Who should receive the alert or notification of a variance (distribution list of internal and external organization recipients)

How to deliver the alert or notification of a variance (email or internal system notice)

The priority and status of the notification

Each test is saved to archive 304 to eliminate recurring configuration. The test is executed through the means of a scheduler function, block 200 FIGS. 3, 4 and 5, or run immediately in the case of an ad hoc test. An activity log maintained in archive 304 captures all relevant information about each individual test conducted, block 304 FIGS. 3, 4 and 5. User 120 can review this log and drilldown into the status and result specifics of any test.

The invention is designed in such a way as to allow the continuous creation and addition of completely new assurance target 104 tests without changing specific application code in the delivery of these functions.

The assurance target 104 test scheduler 184 and execution engine (variance calculator 112) run asynchronously to allow multi-tasking of client resources. Assurance target 104 test can be stopped and restarted from point of termination. Tests can be scheduled based on date & time, period or event (i.e. receipt of carrier bill or network traffic feed).

The system provides guidance to user 120 in selecting the appropriate assurance target 104. User 120 then selects a variance threshold in user preferences 100 and designates in notification module 116 different notification responses with optional guidance from user preferences 100.

As part of user preferences 100 setup, all primary and secondary contacts are designed into the system, with email and backup email addresses. In one embodiment, the system will be hosted and therefore carrier contacts are kept up to date with no effort required from the enterprise.

For example, user 120 may select a long distance voice contract ID. User preferences 100 then offers options specific to long distance voice contracts and user 120 may select the market rates category. Within this category, user 120 may drill down, as an example, to the dedicated interstate rate or to another rate or, more likely, user 120 may select all rates.

The target for the selected rates is market rates which can be automatically populated into the assurance target 104. User 120 may then select a variance threshold expressed as a percentage over market rates. For example, user 120 may select a threshold of 10% over market rates and store this information into user profile 196. Finally, user 120 is allowed to designate through the notification module 180 a notification response 116 when the variance threshold is exceeded, which may be an email, an electronic page, a pre-recorded phone message, a fax or the like.

The entity(s) contacted may be inside and/or outside the user's organization. User preferences 100 will provide guidance to user 120 as to alternative responses for consideration. For example, the system can determine whether the specific contract has a renegotiation clause that allows user 120 to renegotiate if the contract rates exceed market rates by a certain percentage. If user 120 has a renegotiation clause in the relevant contract, the user preferences 100 prompts user 120 to include a renegotiation advisory as part of notification response 116.

Figure 3:
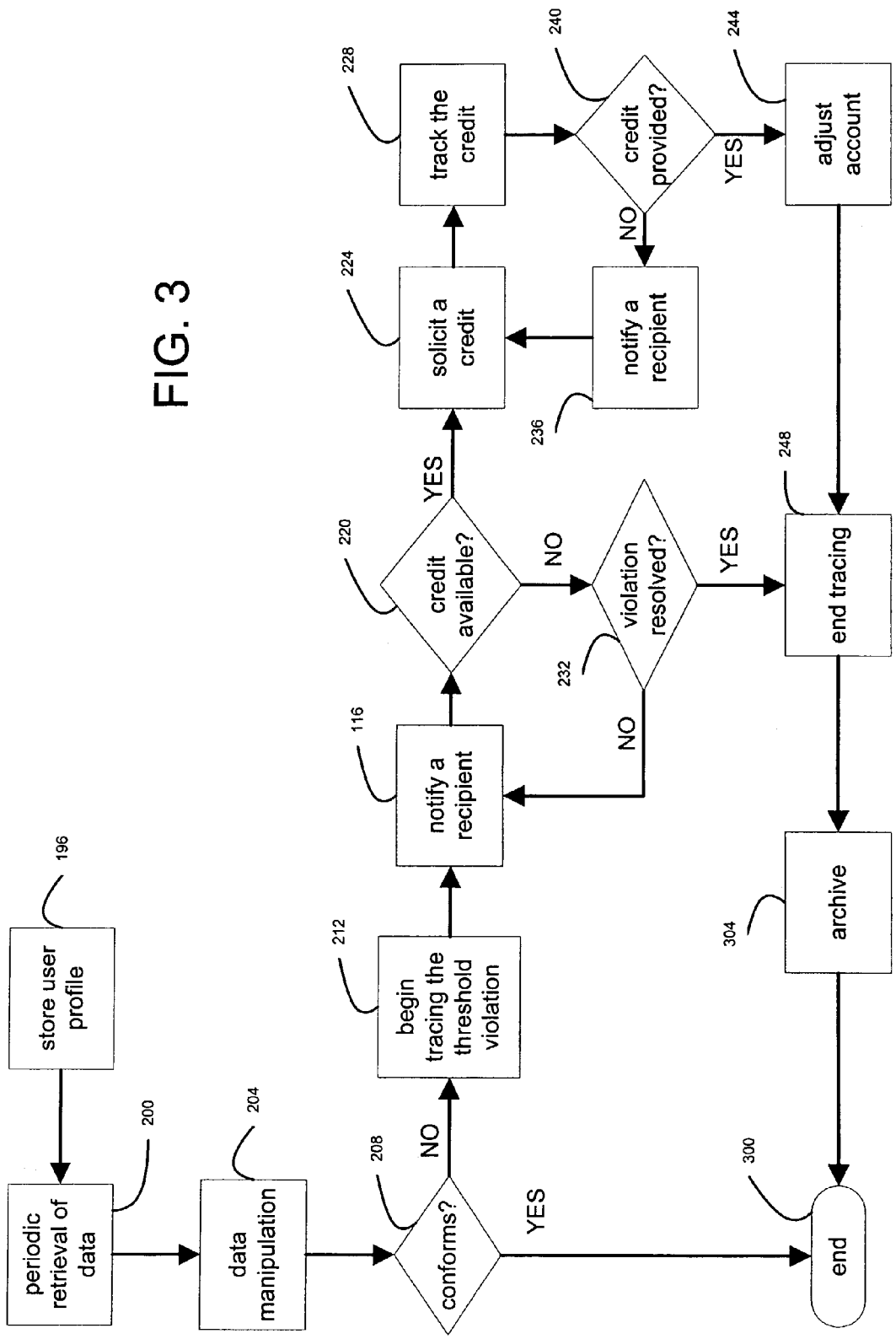
FIG. 3 is a flow chart of the services assurance function of an embodiment of the invention represented in FIGS. 1 and 2.

Referring now to FIG. 3, user 120 may also set-up assurance tests in the area of contract constructs. One obvious area of testing that falls in the contract constructs category is bill auditing. Users 120 can request that the system compare actual rates charged to the rates in the original contract in data manipulation 204. As with the market rate assurance test, user 120 can select one, multiple or all of the rates from a contract. Also, user 120 can pick a variance threshold expressed as a variance and/or as a dollar amount. For a notification response 116, user 120 may elect to have a person or person(s) internal to user's 120 organization notified 116 and/or to have the vendor notified 116 of the error with a request for a credit block 224 on the following bill. The system looks for the credit, block 228, as well as a correction in rates applied on subsequent bills, block 244, and notify user 120 of a negative result, block 236. Other Contract Construct tests that can be selected include rounding and contract commitment.

Service level agreement constructs is another category that user 120 may select during the user preferences 100 process. Like the contract, a service level agreement is a document describing the vendor's obligations and user 120's rights during the term of the agreement. These obligations and rights center around the level of service provided and include such items as percentage up time, mean time to repair and credits available if minimum service levels are not attained. During user preferences 100 set-up, user 120 may select from the specific terms provided in a specific product or service agreement. These specific terms will have been loaded into the system, preferably electronically, prior to user 120 accessing the user profile 196 system. Notification response 116 options are similar in nature to the options available for the contract constructs category and include closed-loop dispute resolution.

Figure 4:
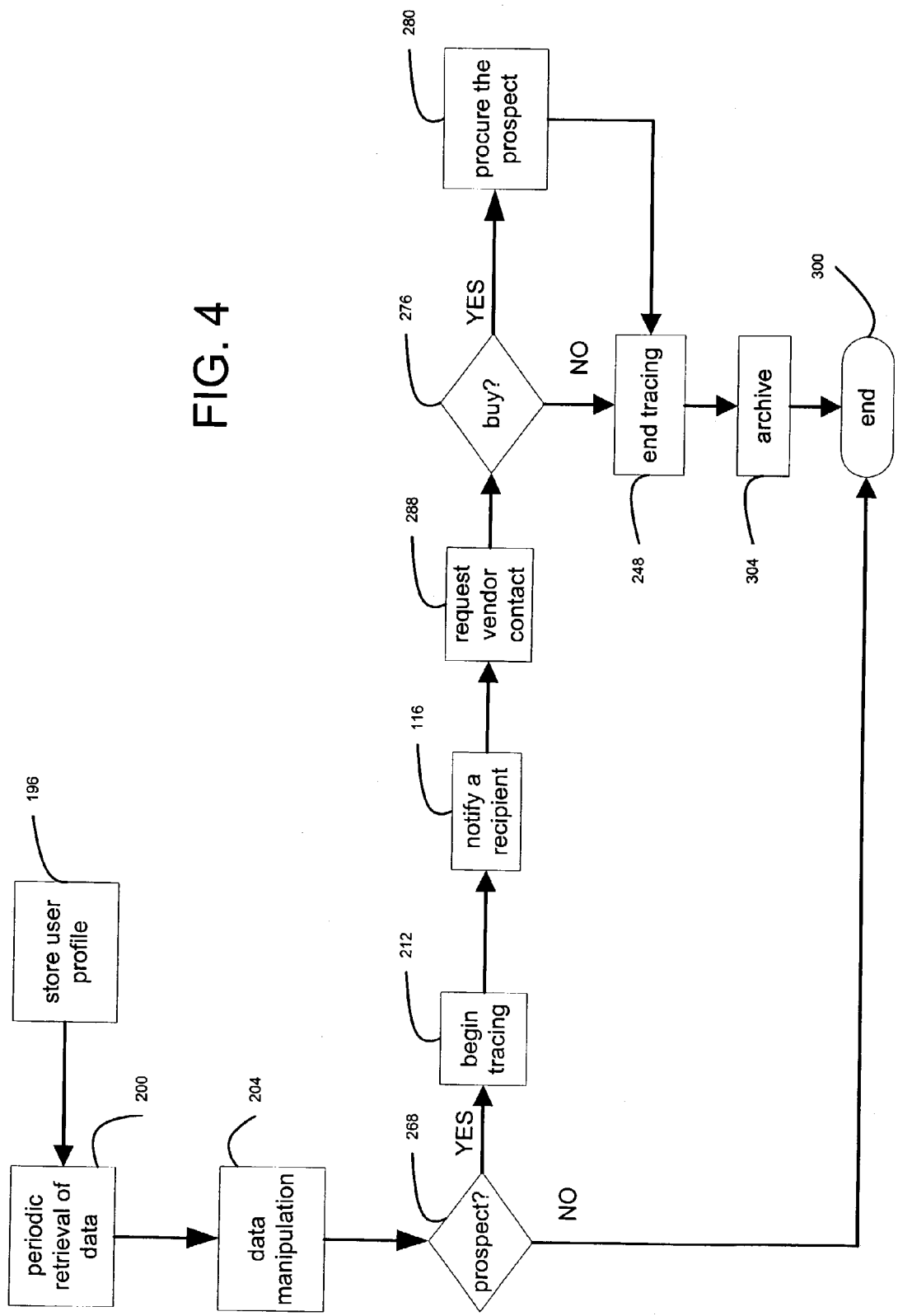
FIG. 4 is a flow chart of the procurement function of an embodiment of the invention represented in FIGS. 1 and 2.

Referring now to FIG. 4, user profile 196 for network design optimization can again be exemplified based on products tied to a telecommunication contract. User 120 can select all or some of the products tied to a contract and choose to be alerted when products or services or design alternatives become available that will save costs and/or improve service. For example, user 120 may elect, block 268, to be notified, block 116, if a service becomes available that will potentially reduce user 120's frame relay costs by at least 40% while degrading service by no more than 10% as calculated in block 264. Another user 120 may elect, block 268, to be notified, block 116, when or if a service becomes available that will potentially improve service by at least 15% without increasing costs by anymore than 10% as calculated in block 264. During user preferences 100 set-up, user 120 also dictates how he or she wants to be notified 116. Notification 116 options include a simple notification via email, page, fax or the like listing the product, service or design alternative or it could be a detailed description of the alternative or it could be direct contact by the vendor, block 288, offering the potential alternative or even an option to procure, block 280, the product or service automatically.

Figure 5:
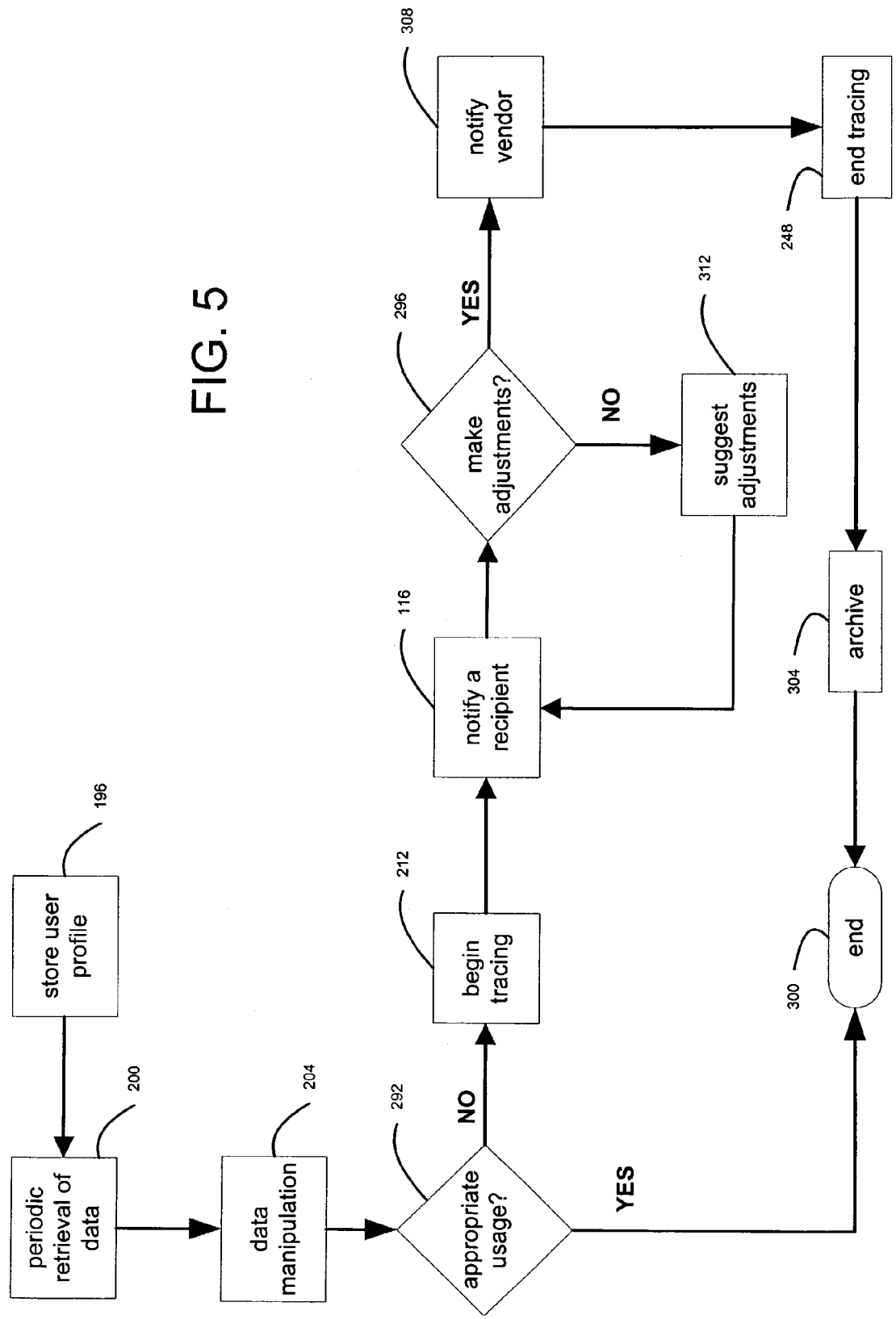
FIG. 5 is a flow chart of the utilization function of an embodiment of the invention represented in FIGS. 1 and 2.

Referring now to FIG. 5 for the category utilization, user 120 may store in user profile, block 196, to select under- and/or over-utilization for appropriate products. The invention periodically retrieves data, block 200, from the system and manipulates the data, block 204, to assess the system's utilization capacity. Data manipulation 204 can be any type of mathematical modeling using numerical methods as well as comparisons based on technical specifications. Accordingly, warnings for under-utilization can be made in block 116 and include recommendations for scaling down the network to save costs. Warnings for over-utilization can be made in block 116 and include recommendations for sizing up a network or even replacing the product with a better-suited product. User 120 can also select to notify, block 116, the telecommunication vendor directly so that the vendor can make appropriate adjustments, block 296.

Referring back to FIGS. 1 and 2, assurance module 172 is in communication with database 152 in which user preferences 100 of the designated target assurance measurements are defined by user 120 in the user profile defined in user preferences 100. Each category has its own target metric that stored, preferably electronically, for easy comparison to actual performance measurement in the performance measurement module 108 as discussed below. To explain assurance targets 104, specific examples for each of the five categories we have described previously.

Assurance targets 104 for market rates includes the best plans and rates available in the marketplace that an intelligent buyer, with some level of research and negotiating, could secure. Rate changes are automatically retrieved from a central rate knowledgebase repository of provider data 144 that is managed by the system. In one embodiment, assurance target 104 is automatically updated by host 128 as rates change during the term of the contract. These rates and plans are stored in a format so that they may be applied to appropriate users 120. For example, rates are categorized by monthly telecom spend and length of commitment for easy and appropriate comparison purposes in variance module 112.

Assurance target 104 for contract constructs are the actual contract terms negotiated by user 120 with the telecommunication vendor and stored in a format that is easily measured in user preferences 100. Sample constructs include rates for the services, commitment levels and rounding increments. Assurance target 104 for rates are the actual plans and rates negotiated at the onset of the specific contract. If these rates or plans change during the term of the contract, assurance target 104 is automatically updated.

Assurance target 104 SLA constructs are the actual service level agreement terms negotiated by user 120 with the telecommunication vendor and stored in a format that is easily measured in user preferences 100. Sample SLA terms include mean time to repair, allowable downtime, and credits for failure to meet SLA terms.

Referring back to FIG. 4, assurance target 104 for network design optimization is a database of potential substitute products and services for the selected product or service as defined in provider data 144. The potential substitute products and services are given a price score and a service score as part of their provider data 144. This assurance target 104 can be maintained by the host 128 or updated automatically by participating vendors utilizing a metadata format such as SGML, XML or the like. In a hosted system, new offerings by telecommunication providers are reviewed, assessed and entered into the system on a periodic basis, block 200. A new product, service or design is given a service score, a price score and is cross-referenced to any products, services or designs it could potentially replace. For example, a new virtual private network offering might be given a service score of 80, a price score of 70 and it may be cross-referenced to other VPN offerings and to frame relay offerings. New offerings are either identified by host 128 that manages the target performance measurement module 108 or they may be introduced by telecommunication vendors who participate in a program allowing them to introduce new offerings to users 120 of the system.

Assurance target 104 for utilization is a listing of acceptable utilization performance levels as determined by user 120. Different users 120 will have different utilization requirements. Some organizations will require a large margin of excess utilization because their traffic is sensitive or its volume is unpredictable. Other companies will tolerate tighter utilization specifications because of the cost savings. An example of an assurance target 104 for utilization on a T1 Internet connection would be 85% and this would be defined in user preferences 100.

Performance measurement module 108 collects or stores the performance data 148 which will determine actual performance of the selected category. For instance, performance data 148 for market rates is the listing of rates at the time of contract. Accordingly, if user 120 agreed to pay 3 cents per minute for interstate calling, this would be the performance measurement module 108 threshold for interstate calling for this user.

The performance measurement module 108 for contract constructs is collected primarily from user 120 bills. Performance measurement module 108 threshold for rates and rounding are collected from the call detail records that come with user 120's monthly bills. Performance measurement module 108 for commitment is also collected from user 120 monthly bills and is added to previous bills in order to measure where a user is tracking in terms of meeting any usage commitment.

Performance measurement module 108 for SLA constructs is collected from carrier resources as well as third party sources that offer independent monitoring tools. Circuit downtime is an example of an actual performance measurement data 148 that can be collected from either carrier provided tools or third party resources. User 120 is also able to log in events to help measure actual performance of SLA constructs.

The actual assurance inventory for network design optimization is an inventory of user 120's telecommunication products, services and network designs and is stored as user preferences 100. The invention allows for each product, service and design to be assigned a service score and a price score. These scores are objectively assigned. The inventory of a user 120's telecommunication services, products and designs with their respective service score and price score makes up the actual assurance inventory for network design optimization and is stored as user preferences 100. As an example, user 120 may have a traditional frame relay network that is assigned a service score of 80 and a price score of 95. This information is stored and updated as needed in user preferences 100.

The actual performance measurement data 148 for utilization is calculated by using both carrier provided tools as well as tools offered by independent third parties. Actual bandwidth measurements are made on user 120 circuits and tracked overtime.

Variance calculator 112 is the system that compares the variance between actual performance measurement data 148 and the assurance target 104. Each category and sub-category have a number of tests that can be run at a user-defined frequency, block 200 FIGS. 3, 4, and 5, to determine the variance between actual, performance data 148, and targeted performance, user preferences 100.

Referring back to FIGS. 1 and 2, the market rate variance calculator 112 computes the difference between actual rates contracted by user 120 and existing market rates for similar services at similar commitment periods and levels.

The contract construct variance calculator 112 determines whether certain constructs within a telecommunications contract are being met. For example, there are at least eight rate tests that the variance calculator runs:
Correct rates
Correct calculations and rounding
Application of discounts
Call increment and rounding
Recurring charges
Non-recurring charges
Match billing with call accounting stats
Billing intervals match installation dates The SLA construct variance calculator 112 compares commitments made by the telecommunication vendor in the service level agreement to actual service levels delivered and calculates any variance. For example, if the carrier committed to an 8 hour mean time to repair, but actually delivers a 10 hour mean time to repair, a 2 hour variance would be calculated.

The network design optimization variance calculator 112 compares the service and price scores of new services, products and designs to services, products and designs to which they have been cross-referenced that already exist in the system. For example, the new virtual private network offering mentioned in the target performance measurement for network design optimization paragraph above would be compared to the frame relay network mentioned in the actual assurance inventory for network design optimization paragraph above. The virtual private network had a service score of 80 and a price score of 70 while the frame relay network had a service score of 100 and a price score of 120. Variance calculator 112 would determine via data manipulation 204 that the new virtual private network had a service performance decrease of 20% and a price reduction of 42%.

The utilization variance calculator 112 would compare actual utilization, performance data 148, with utilization targets, user preferences 100 entered by user 120. If user 120 had entered a target user preference 100 of 80% and the actual utilization, performance data 148, was measured at 90%, an "over utilization" of "10%" would be calculated.

Notification information system (NIS) 116 in the notification module 180 maintains the user-defined responses, user preferences 100, defined by user 120 during user setup. This feature contains the definition, delivery, tracing block 248 and escalation of an alert/notification 116 FIGS. 3, 4 and 5. Each alert/notification 116 contains economic related data calculated, block 204, from the variances identified in the specific test that generated it. The alert/notification 116 also contains the following user 120 configured information:
Description and narrative
Priority and status
Escalation and follow-up timeframes
Distribution list of whom (both internal and external organization personnel) should receive the item and how
Use of contract related constructs for further filtering and screening
Events that trigger notifications NIS 116 delivers the alerts/notifications via normal email and/or internal system generated messages. NIS 116 also provides query, display and drilldown functions for each alert/notification 116.

NIS 116 also provides a closed loop dispute tracing module 164 (FIG. 2) that monitors a variance generated by an assurance test 104 through all stages of its resolution process. This provides visibility and tracing, block 212, of each telecommunications issue across the enterprise including all external contact points (i.e. service providers). It insures all steps are completed, blocks 232 and 240, communications are logged, block 212, and the proper follow-up was given to each dispute, blocks 232 and 240, greatly increasing the speed and accuracy of telecommunications credit enforcement, block 244.

Each telecommunications assurance variance alert 116 can generate a service provider dispute which is given a user 120 configurable, predefined workflow based on multiple information elements (i.e. service provider, product, credit amount, etc.). The NIS 116 traces, block 212, the dispute through every step in the resolution process workflow and generates escalation alerts, block 232, if any process steps are delayed or disputes are overdue.

NIS 116 takes as an input the variances determined by the variance calculator 112 and generates the appropriate response as defined by user 120 in the user preferences 100. Possible responses include sending alerts, block 116 FIGS. 3, 4 and 5, to user 120 and/or to the telecommunication vendor. User 120 may define category and/or individual test specific distribution lists and action requests to carriers. NIS 116 can also, where appropriate, seek credits, block 220, and initiate a closed-loop tracking resolution process, blocks 212 and 228.

Referring to FIG. 5, NIS can also interpret the variance, block 292, and begin exercising certain rights, block 296, available in user 120's contract. For example, if a negative variance exists in user 120's usage commitment and user 120 had a business down-turn clause included in the relevant contract, NIS 116 could either recommend to user 120 that the Business down-turn clause be acted upon, block 312, or NIS 116 could automatically alert the carrier, block 308, that user 120 was activating the clause.

Another example of NIS 116 automatically activating a contract clause, block 296, would be if the variance calculator 112 determined that a new technology was available that would better serve user 120, NIS 116 could notify the carrier, block 308, that user 120 intended to exercise its right to switch to a better technology as allowed in user 120's contract.

As described above in the user setup section, user 120 can define in user preferences 100 specific details on how NIS 116 should perform under varying circumstances. User 120, for example, can specify notification, block 116, based on different events such as variance resolution, block 232 (FIG. 3), receipt of credit, block 240 (FIG. 3), or any number of options.

In some cases, user 120 may elect to be notified directly by the telecommunication vendor in which case the notification information system 116 would forward appropriate contact information to the telecommunication vendor. For example, referring back to the network optimization example we have been using that compares a new virtual private network to an existing frame relay system, if user 120 had selected during user preferences 100 set-up to be notified directly by a new vendor offering an alternative to a frame relay infrastructure if the offering could reduce costs by at least 35% while decreasing service by no more than 30%, the notification information system 116 would forward user 120's contact information to the vendor offering the virtual private network.

NIS 116 also maintains a summary of all variance results including a status of all discrepancies and summary of all alerts issued in archive 304 (FIGS. 2, 3, 4 and 5). NIS 116 also includes a complete and simple contact management sub system that tracks all communications with the carriers for proper follow-up and history records to insure credits are enforced, block 228 (FIG. 3).

What is claimed is:

1. A system for managing a telecommunications service provider contract between a telecommunications service provider and a user, the system comprising:
a server;
an agreements database accessible by the server, the agreements database having stored thereon telecommunications performance data indicative of minimum telecommunications service performance required by at least one service provider agreement;
a user preferences database accessible by the server, the preferences database having stored thereon user preference data indicative of a user specified threshold corresponding to a maximum allowable deviance from the minimum telecommunications service performance;
a performance measurement module in communication with the server; the performance measurement module gathering actual telecommunications performance data indicative of actual telecommunications service performance provided to the user for a telecommunications network configuration;
a variance calculator module in communication with the server, the variance calculator module determining agreement conformity status by determining whether the telecommunications service performance provided to the user and indicated by the gathered actual telecommunications service performance data corresponds with the minimum telecommunications service performance indicated by the contracted performance data within the maximum allowable deviance indicated by the user preference data;

said threshold defining a limit for the maximum allowable deviation from the minimum telecommunications service performance; and a notification module in communication with the server, the notification module notifying a recipient that the determined agreement conformity status has exceeded the threshold;

wherein the telecommunications service provider agreement comprises a performance metric selected from the group consisting of: market rates, contract constructs, service level agreement constructs, network design optimization and utilization and combinations of these.

2. The system of claim 1 further comprising:

a network connection in communication with the server;

a host interface coupled to the server, the host interface used for hosting the system; and a user interface in communication with the server, the user interface used for updating user preferences database and checking variance calculator module determinations.

3. The system of claim 1 further comprising:

a network connection in communication with the server;

a host interface coupled to the server, the host interface used for hosting the system; and a user interface in communication with the server, the user interface used for updating user preferences database and thresholds and for receiving notification from the notification module.

4. The system of claim 1 further comprising a scheduling module coupled to the server, the scheduling module used to define chronological timing of the variance calculator module's determination of agreement conformity status.

5. The system of claim 1 wherein the telecommunications service provider agreement comprises a type selected from the group consisting of application, storage, management, internet service level, data, voice and/or combinations of these.

6. The system of claim 1 wherein when the performance metric comprises market rates, the system searches for optimal rates available in the market for telecommunications service provider services and products.

7. The system of claim 1 wherein when the performance metric comprises service level agreement constructs, the service level agreement constructs include the telecommunications service provider's obligation to deliver a certain level of service selected from the group consisting of: percentage of downtime, mean time to repair, credits that the telecommunications service provider must issue to the user in the event of failure to meet contracted obligations.

8. The system of claim 1 wherein when the performance metric comprises network design optimization, the telecommunications network configuration is analyzed and modified to increase the level of service provided to and to lower a price offered to the user.

9. The system of claim 1 wherein when the performance metric comprises network design utilization, the telecommunications network configuration is analyzed to determine whether the network is either over-utilized or under-utilized.

10. A system for facilitating the procurement of networked telecommunications services between a telecommunications service provider and a user, the system comprising the steps of:

a server;

a user preferences database accessible by the server, the user preferences database having stored thereon user telecommunications need data indicative of a user's requirements for networked telecommunications services;

a service provider database accessible by the server; the service provider database having stored thereon available telecommunications services data indicative of telecommunications services offered by a plurality of networked telecommunications service providers;

a provider module in communication with the server, the provider module updating in real-time the available telecommunications services data;

a variance calculator module in communication with the server, the variance calculator module determining telecommunications procurement prospects by calculating which of the telecommunications services offered by the plurality of networked telecommunications service providers indicated in the available services data satisfies the user's requirements for networked telecommunications services indicated in the user telecommunications need data; and a scheduling module coupled to the server, the scheduling module used to define chronological timing of the variance calculator module's determination of available telecommunications procurement prospects;

a performance metric for monitoring the networked telecommunications services selected from the group consisting of: market rates, contract constructs, service level agreement constructs, network design optimization and utilization and combinations of these.

11. The system of claim 10 further comprising:

a network connection in communication with the server;

a host interface coupled to the server, the host interface used for hosting the system; and a user interface in communication with the server, the user interface used for updating user preferences database and checking variance calculator module determinations.

12. The system of claim 10 further comprising:

at least one threshold set in the user preferences database; and a notification module in communication with the server, the notification module notifies a recipient that a procurement prospect has been identified.

13. The system of claim 12 further comprising:

a network connection in communication with the server;

a host interface coupled to the server, the host interface used for hosting the system; and a user interface in communication with the network connection, the user interface used for updating user preferences database and thresholds data.

14. The system of claim 10 wherein the networked telecommunications services comprises a type selected from the group consisting of application, storage, management, internet, service level, data, voice, and/or combinations of these.

* * * * *